United States Patent
Endow et al.

(10) Patent No.: US 12,323,678 B2
(45) Date of Patent: Jun. 3, 2025

(54) TEMPORARY PRE-ROLL CONTENT PROVISION WITH STREAMING CONTENT

(71) Applicant: NBCUniversal Media, LLC, New York, NY (US)

(72) Inventors: William Y. Endow, Burbank, CA (US); Naman Diwaker, Weehawken, NJ (US); Robert Galluccio, New York, NY (US)

(73) Assignee: NBCUniversal Media, LLC, New York, NY (US)

( * ) Notice: Subject to any disclaimer, the term of this patent is extended or adjusted under 35 U.S.C. 154(b) by 0 days.

(21) Appl. No.: 18/078,589

(22) Filed: Dec. 9, 2022

(65) Prior Publication Data

US 2024/0196063 A1 Jun. 13, 2024

(51) Int. Cl.
*H04N 21/2387* (2011.01)
*H04N 21/234* (2011.01)
*H04N 21/472* (2011.01)
*H04N 21/81* (2011.01)
*H04N 21/845* (2011.01)

(52) U.S. Cl.
CPC ... *H04N 21/8126* (2013.01); *H04N 21/23406* (2013.01); *H04N 21/2387* (2013.01); *H04N 21/47202* (2013.01); *H04N 21/8456* (2013.01)

(58) Field of Classification Search
CPC ......... H04N 21/8126; H04N 21/23406; H04N 21/2387; H04N 21/47202; H04N 21/8456
See application file for complete search history.

(56) References Cited

U.S. PATENT DOCUMENTS

| 11,223,868 | B2 * | 1/2022 | Zhou | H04N 21/262 |
|---|---|---|---|---|
| 2014/0189139 | A1 | 7/2014 | Cheng et al. | |
| 2015/0326945 | A1 * | 11/2015 | Johnson | H04N 21/472 725/32 |
| 2022/0217194 | A1 * | 7/2022 | Sodagar | H04L 65/612 |

OTHER PUBLICATIONS

European Examination Report; EP Application No. EP23208544.9; dated Apr. 9, 2025.

* cited by examiner

*Primary Examiner* — Mulugeta Mengesha
(74) *Attorney, Agent, or Firm* — Fletcher Yoder, P.C.

(57) ABSTRACT

The present disclosure is generally directed to providing temporary pre-roll content with requested streaming content. Specifically, pre-roll content is provided to an end-user prior to an initial playback of streaming content, but is not presented when a backward time shift event occurs within playback of the streaming content. In this manner, missed segments prior to the start of the streaming content may be presented in lieu of the pre-roll content during the backward time shift event.

22 Claims, 9 Drawing Sheets

TEMPORARY PRE-ROLL CONTENT PROVISION WITH STREAMING CONTENT

BACKGROUND

The present disclosure relates generally to providing supplemental pre-roll content with requested streaming content. More particularly, the present disclosure relates to providing pre-roll content with streaming content in a manner that refrains from providing the pre-roll content upon subsequent playback time adjustment of the streaming content.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Content streaming, the concurrent reception and playback of digital content (e.g., video and/or audio content), has become a popular distribution mechanism for digital content. Unfortunately, however, streaming content is somewhat inflexible, traditionally adhering to a playback sequence dictated by a single manifest of a content stream. Accordingly, under traditional techniques, when content is added to a content stream, the content is typically added to the manifest and/or is provided in purposeful replacement portions of content, designed for playback of replacement content. Unfortunately, these techniques result in added content becoming a part of the playback stream that remains with playback regardless of alterations to the playback timing by a user. This may hinder certain desirable user experiences. For example, upon a time-shift in reverse to a time where pre-roll content is played, it may be desirable to play the streaming content that would have been played had the pre-roll content not played during the playback time. The traditional content insertion techniques for streaming content do not facilitate for such functionality. Thus, new content insertion techniques are desirable.

BRIEF DESCRIPTION

Certain embodiments commensurate in scope with the originally claimed subject matter are summarized below. These embodiments are not intended to limit the scope of the claimed subject matter, but rather these embodiments are intended only to provide a brief summary of possible forms of the subject matter. Indeed, the subject matter may encompass a variety of forms that may be similar to or different from the embodiments set forth below.

The current embodiments relate to systems and methods for temporarily inserting pre-roll content with requested streaming content. Using the techniques described herein, playback of the pre-roll content and the requested streaming content may be integrated in a manner that the transition from playback of the pre-roll content to playback of the requested streaming content appears seamless to the end-user. Further, upon a playback time shift backwards to an associated time when the pre-roll content was played, the streaming content may be played back (at the requested shifted playback time) in lieu of the previously played back pre-roll content. In this manner, the end-user may experience playback of the requested streaming content without interruption from pre-roll content, despite the pre-roll content previously being played at the associated playback time. This may be particularly important during live content streaming, where the requested streaming content may not start with a first sequential segment of the content, due to requesting and/or starting playback at a time later than an initial playback time of the live content.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements.

Figure 1:
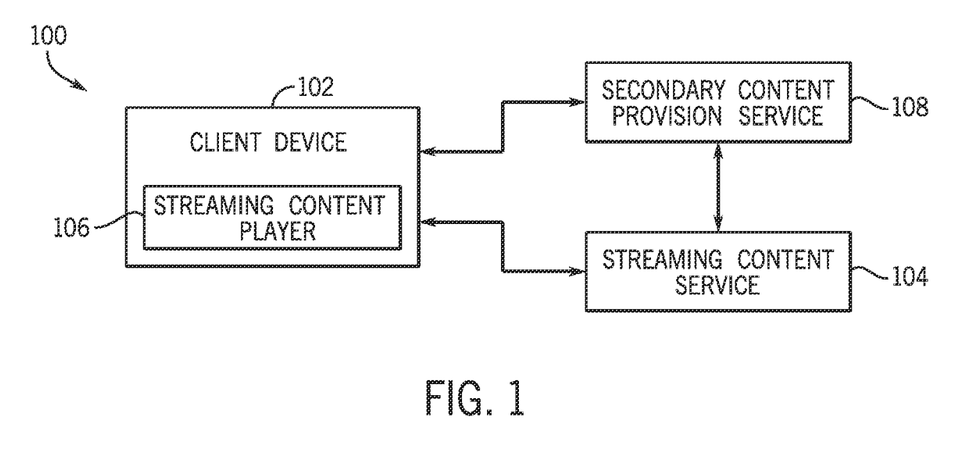
FIG. 1 is a block diagram of a temporary pre-roll content insertion system, in accordance with an embodiment of the present disclosure.

Turning now to a more detailed discussion of pre-roll content insertion, FIG. 1 is a block diagram of a temporary pre-roll content insertion system 100, in accordance with an embodiment of the present disclosure. As illustrated, the system 100 includes a client device 102. The client device 102 may request streaming content from a streaming content service 104 to be played in its streaming content player 106. In some instances, the streaming content service 104 may instruct the streaming content player 106 to playback temporary pre-roll content prior to playback of the requested streaming content. More specifically, the streaming content service 104 may request an indication of pre-roll content that should be played back by the streaming content player 106 (e.g., based upon characteristics of a streaming session between the client device 102 and the streaming content service 104, such as demographics of an end-user of the client device, a count of previously viewed secondary content by the client device and/or end-user, a service level of the end-user, an identifier of the requested streaming content, etc.).

Upon receiving an indication of the pre-roll content to be presented prior to the requested streaming content, the streaming content service 104 may provide a command to control the streaming content player 106 to temporarily play the indicated pre-roll content and then switch to playback of the requested streaming content. As mentioned above, the temporary addition of the pre-roll content to playback results in the absence of the pre-roll content upon replay of content at a playback time where the pre-roll content was previously played by the streaming content player 106. Instead, the streaming content player 106 may play a portion of the requested streaming content associated with the replayed playback that does not contain the previously presented pre-roll content. As will be discussed in more detail below, this is done by using a pre-roll content manifest to provide the temporary presentation of the pre-roll prior to the playback of the requested streaming content and then, switching to playback based upon a manifest of the requested streaming content (e.g., including an indication of segments of the streaming content that would have been played during the pre-roll content playback). In this manner, the streaming content player 106, upon a playback time shift back to a playback time when the pre-roll content was played back, will obtain and playback steaming content segments of the requested streaming content without the previously played segments of the temporarily added pre-roll content. This may provide a more desirable user experience. For example, an end-user may rewind the requested streaming content to observe a portion of the requested streaming content that appeared during the previous presentation of the pre-roll content.

Figure 2:
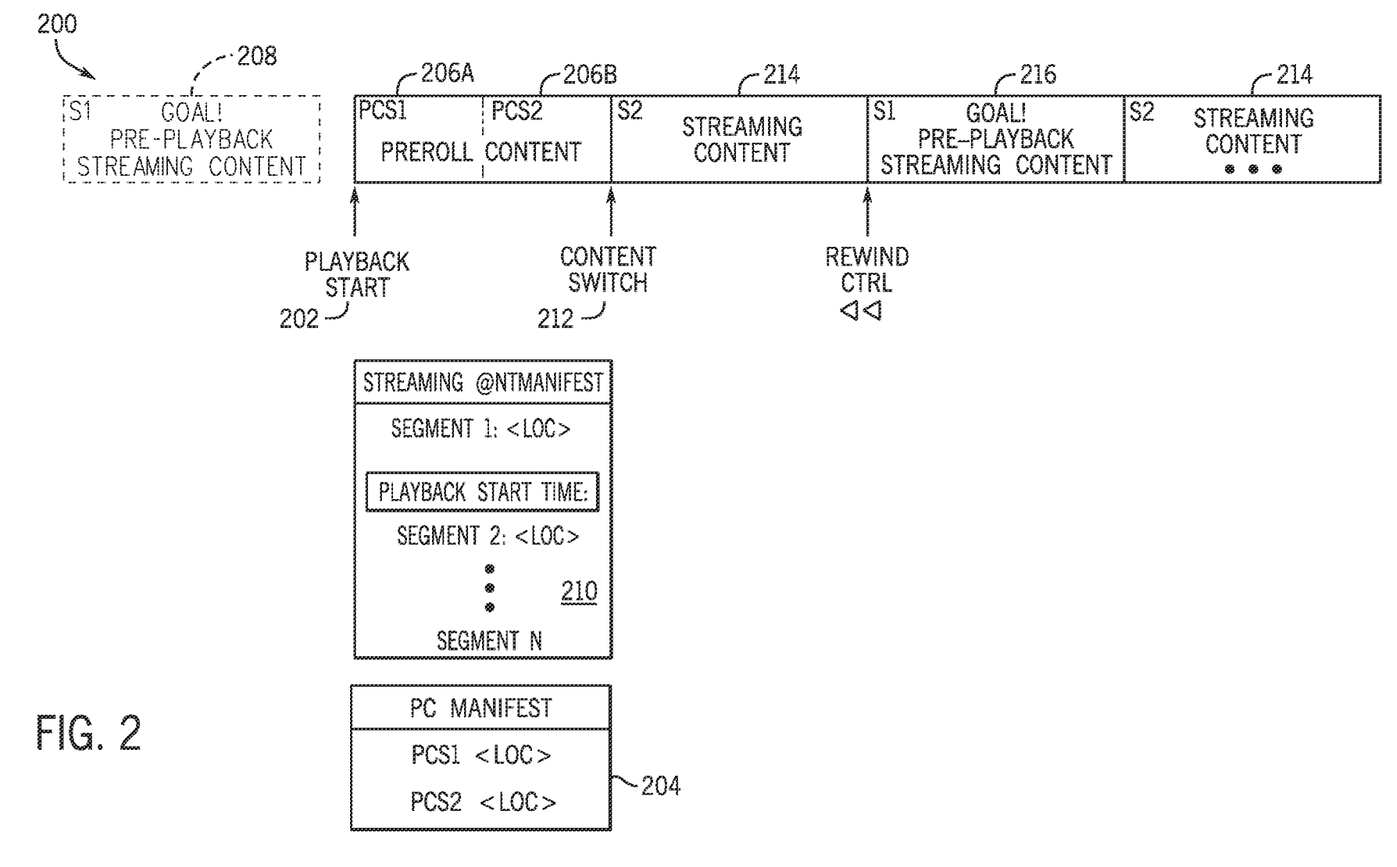
FIG. 2 is a block diagram illustrating a sample use case of temporary pre-roll content insertion, in accordance with an embodiment of the present disclosure.

FIG. 2 is a block diagram illustrating this use case 200, in accordance with an embodiment of the present disclosure. In the use case 200, an end-user requests playback of streaming content, resulting in the playback start 202. An indication to first playback pre-roll content is provided to the streaming content player, where segments of the pre-roll content are defined in the pre-roll content manifest 204. Accordingly, the streaming content player begins playback of segments 206A and 206B of the pre-roll content, defined in the pre-roll content manifest 204. As illustrated, one or more segments of the requested streaming content may occur prior to the playback start and/or during the pre-roll content presentation (e.g., presentation of segments 206A and 206B). Here, a first segment 208 is not initially presented, as it occurs before and/or during the presentation of the pre-roll content.

During presentation of the pre-roll content, the streaming content player may prepare for a content switch 212, by obtaining a requested streaming content manifest 210 and obtaining segments defined in the requested streaming content manifest 210. For live streaming content, the obtained segments may start with segments associated with playback start time that is at the end of the pre-roll content playback. For example, here, segment 2 214 of the requested streaming content is obtained and is presented after the end of the last segment 206B of the pre-roll content, thus completing the content switch 212. In this manner, switching from presentation of the pre-roll content to the requested streaming content may appear seamless to the end-user.

As may be appreciated, segments of the requested streaming content may be skipped/missed in presentation. It may be desirable to enable the end-user to rewind where the pre-roll content is omitted. To do this, the streaming content player may identify a playback time of the playback time shift and identify from the requested streaming content manifest 210, an indication of the segments to replay. As illustrated, the requested streaming content manifest 210 includes an indication of all segments (e.g., here, segment 1 216), despite the streaming content player not having previously played back all segments. Thus, the requested streaming content manifest 210 is able to identify any previous segments for presentation by the streaming content player. The streaming content player may continue to obtain segments (e.g., sequential segment 2 214) and playback these segments until playback is complete. As illustrated, because playback after the initial pre-roll presentation is dictated by the requested streaming content manifest 210, the pre-roll content is not replayed during a rewind session. Instead, the sequentially succeeding segments defined in the requested streaming content manifest 210 are obtained and played back.

Figure 3:
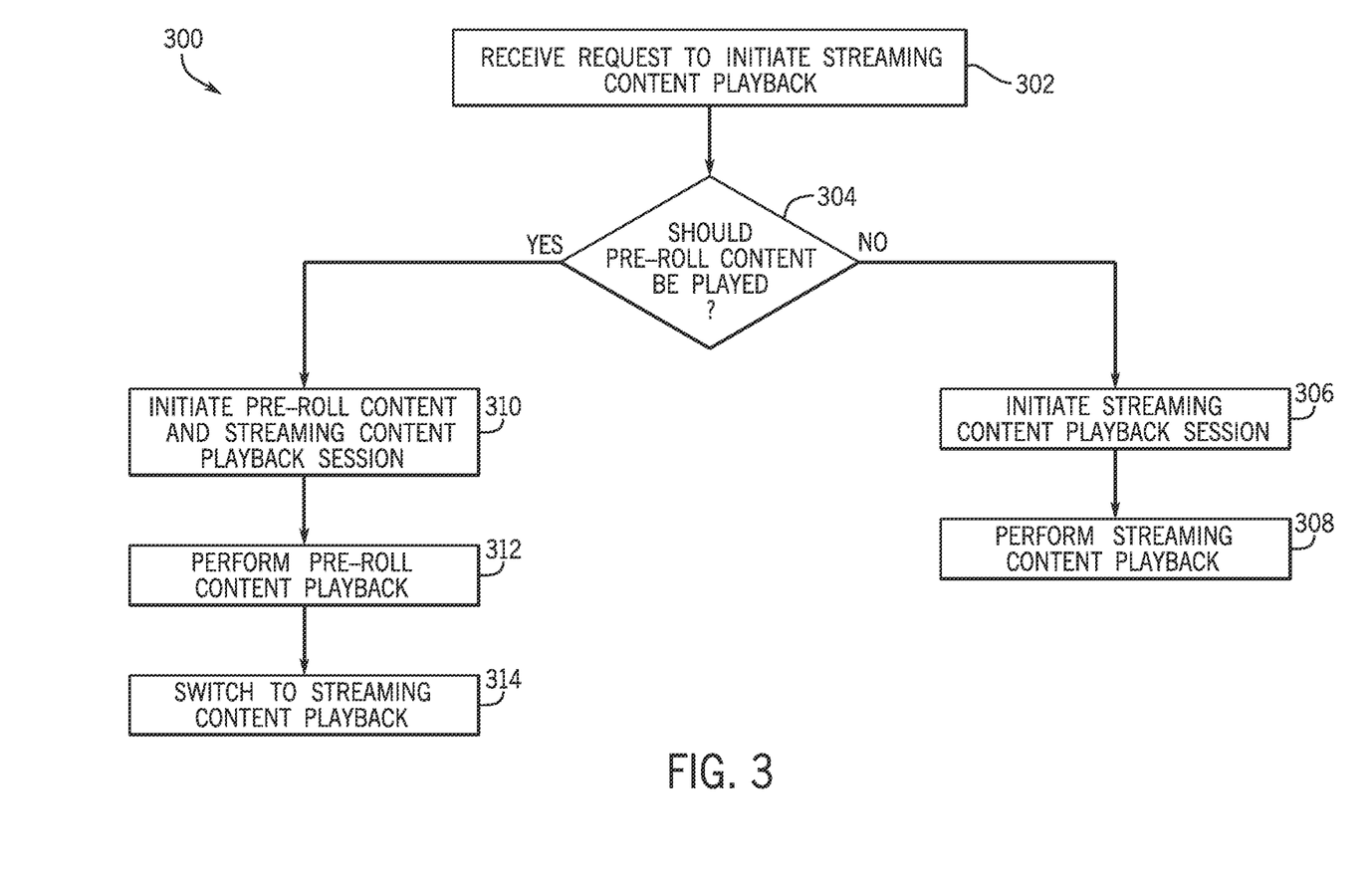
FIG. 3 is a flowchart, illustrating a process for performing temporary pre-roll content insertion, in accordance with an embodiment of the present disclosure.

Having discussed the basic operation of the temporary presentation of pre-roll content with requested streaming data, FIG. 3 is a flowchart, illustrating a process 300 for performing temporary pre-roll content insertion (e.g., a client-side pre-roll content insertion), in accordance with an embodiment of the present disclosure. The process 300 begins with receiving a request to initiate streaming content playback (block 302). For example, an end-user may select content they wish to view via an application and/or website. This selection may result in a request being generated (e.g., by the client device 102) and provided (e.g., to the streaming content service 104) for the particular requested streaming content associated with the selection.

At decision block 304, a determination is made as to whether pre-roll content should be played prior to playback of the requested streaming content. The streamed content may be a single live event such as a sporting event or game tournament. For example, the secondary content decisioning service may identify rules for determining whether pre-roll content should be presented prior to playback of the requested streaming content. These rules may be based upon characteristics of the end-user, characteristics of the streamlining content service, or other characteristics. For example, the rules may indicate that pre-roll content (e.g., advertisements) should not be displayed for particular end-users with a certain level of subscribership and/or that pre-roll content (e.g., advertisements) should be displayed for particular end-users at or below a certain level of subscribership. In some embodiments, the rules may indicate that pre-roll content should not be displayed when particular ad impression obligations have already been satisfied, when an end-user has already been presented a threshold number of secondary content (e.g., advertisements), etc. The pre-roll content rules may be highly customizable and based on any characteristic information provided to secondary content decisioning service.

When pre-roll content should not be played, the content playback session may be initiated (block 306) and the streaming content playback may be performed (block 308). For example, the manifest for the requested streaming content may be provided to the streaming content player 106, enabling the streaming content player 106 to obtain and play back segments of the requested streaming content.

If, however, pre-roll content should be played back, pre-roll content and streaming content playback sessions may be initiated (even concurrently) (block 310), enabling parallel download of segments of the pre-roll content and the requested streaming content. In some embodiments, because the pre-roll content will be played back prior to the requested streaming content, the pre-roll content segments may be obtained with priority over requested streaming content segments, such as by downloading the requested streaming content segments as one or more of the pre-roll content segments are played back (block 312).

Upon completed presentation of the pre-roll segments, a switch from the pre-roll content presentation to presentation of the requested streaming content may be performed (block 314). This switch may occur, in one embodiment, by sequentially filling a playback buffer of the streaming content player with segments of the requested streaming content after the last segment of the pre-roll content is inserted into the playback buffer. In another embodiment, separate buffers and/or players may be maintained for the pre-roll content and the requested streaming content. Upon completion of playback of the pre-roll content via a first buffer and/or first player, the streaming content player may be triggered to switch to the second buffer and/or second player that is already pre-buffered for playback (e.g., by the parallel reception of segments of the requested streaming content, as mentioned above). Either of these approaches may provide a virtually seamless switchover between the pre-roll content presentation and the presentation of the requested streaming content. In some embodiments, the technique used for the switchover may depend on a type of content streaming content player and/or playback device that is used. For example, a first device may not support multiple content players and/or content player buffers and, thus, the technique that utilizes segment insertion of both streams into a single buffer may be preferred for such a device.

Figure 4:
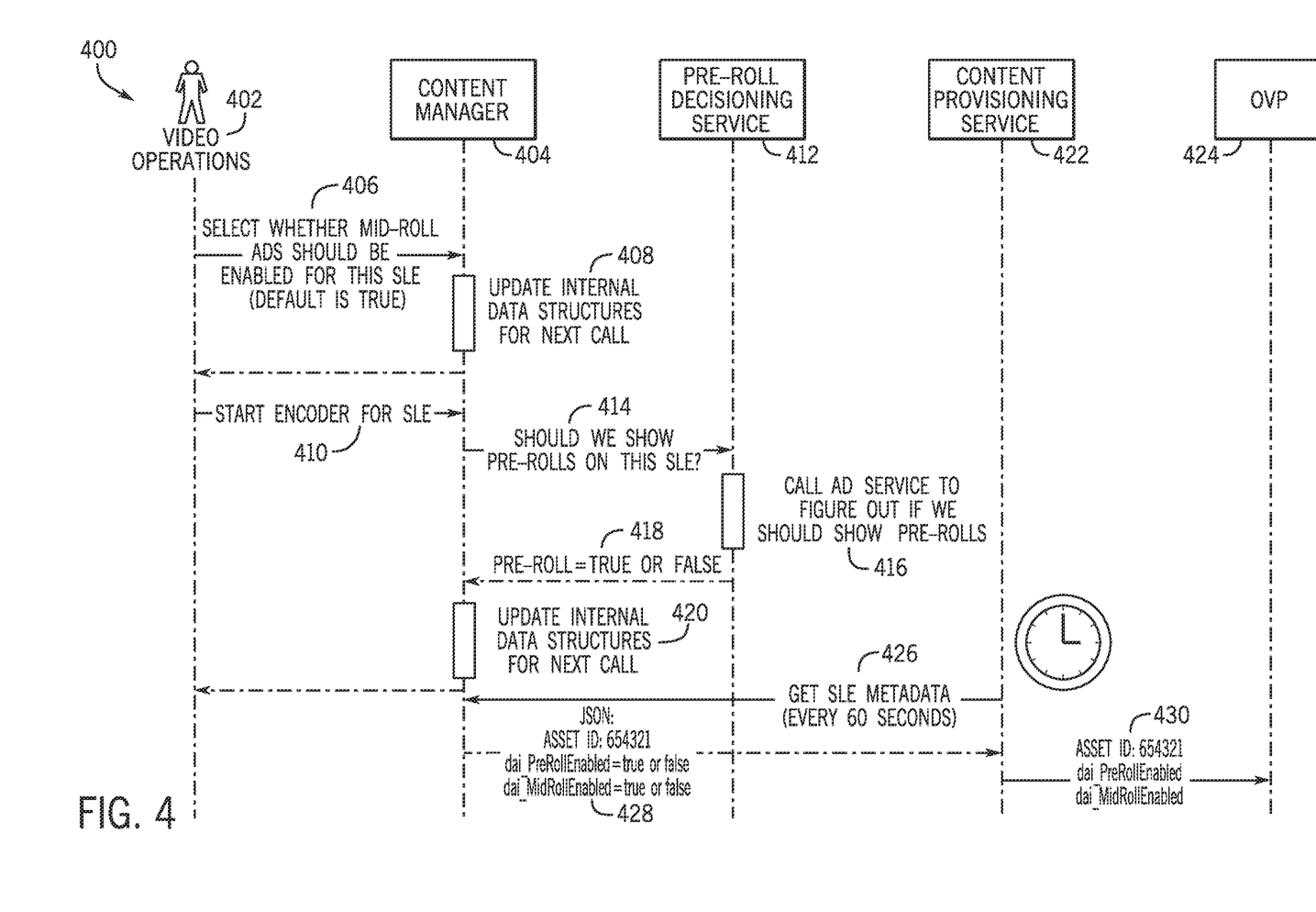
FIG. 4 is a flow diagram, illustrating techniques for providing an indication of whether temporary pre-roll content should be provided with a content stream, in accordance with an embodiment of the present disclosure.

Turning now to a discussion of how the streaming content service 104 may determine when to instruct presentation of pre-roll content, FIG. 4 is a flow diagram, illustrating a process 400 for providing an indication of whether temporary pre-roll content should be provided with a content stream, in accordance with an embodiment of the present disclosure. Specifically, video operations personnel 402 may provide a content manager service 404 an indication of a new live stream to be provided (step 406). This indication may also include an indication of whether mid-roll content (e.g., ads) should be enabled for live stream (e.g., via a binary true/false value).

The content manager service 404 may update the internal data structures to prepare for encoding of the live event (step 408). For example, data tables of the content manager service 404 may be updated to include entries associated with the live event, such as metadata fields, etc.

At step 410, the video operations personnel 402 start the encoding process of the live event (e.g., here illustrated as a single live event (SLE), indicative of a one-time live event, such as sporting event, as opposed to a multi live event (MLE), such as a periodic live show).

Upon triggering of the encoding of the live event, the content manager service 404 polls the pre-roll decisioning service 412 to determine whether pre-roll content should be presented with the live event (step 414). In response, the pre-roll decisioning service 412 calls the ad service to determine whether pre-roll content should be presented (step 416). An indication of whether pre-roll content should be presented is provided from the pre-roll decisioning service 412 to the content manager service 404 (step 418). The internal data structures are updated based upon this indication (step 420). This process may continue periodically, e.g., every 60 seconds, enabling up to date indications of whether pre-roll content should be provided periodically.

The content provisioning service 422 may request, from the content manager service 404) the live event metadata periodically (e.g., every 60 seconds) (step 426), which results in the updated indication being returned to the content provisioning service 422 (step 428). The content provisioning service 422 returns the updated indication to the Over the Top (OTT) video platform 424 for publication to OTT devices that request the streaming content (step 430).

While the process 400 is illustrated as implemented by a plurality of components (e.g., the content manager 404, the pre-roll decisioning service 412, the content provisioning service 422, and the OTT video platform 424), this is just one embodiment of components that may perform the process 400 and is not intended to limit the scope to the illustrated components. Indeed, the steps of process 400 may be implemented by more or fewer components. For example, in one embodiment, each step illustrated as being completed by one of the content manager 404, the pre-roll decisioning service 412, the content provisioning service 422, and the OTT video platform 424 of FIG. 4 may be implemented by a single component.

Figure 5:
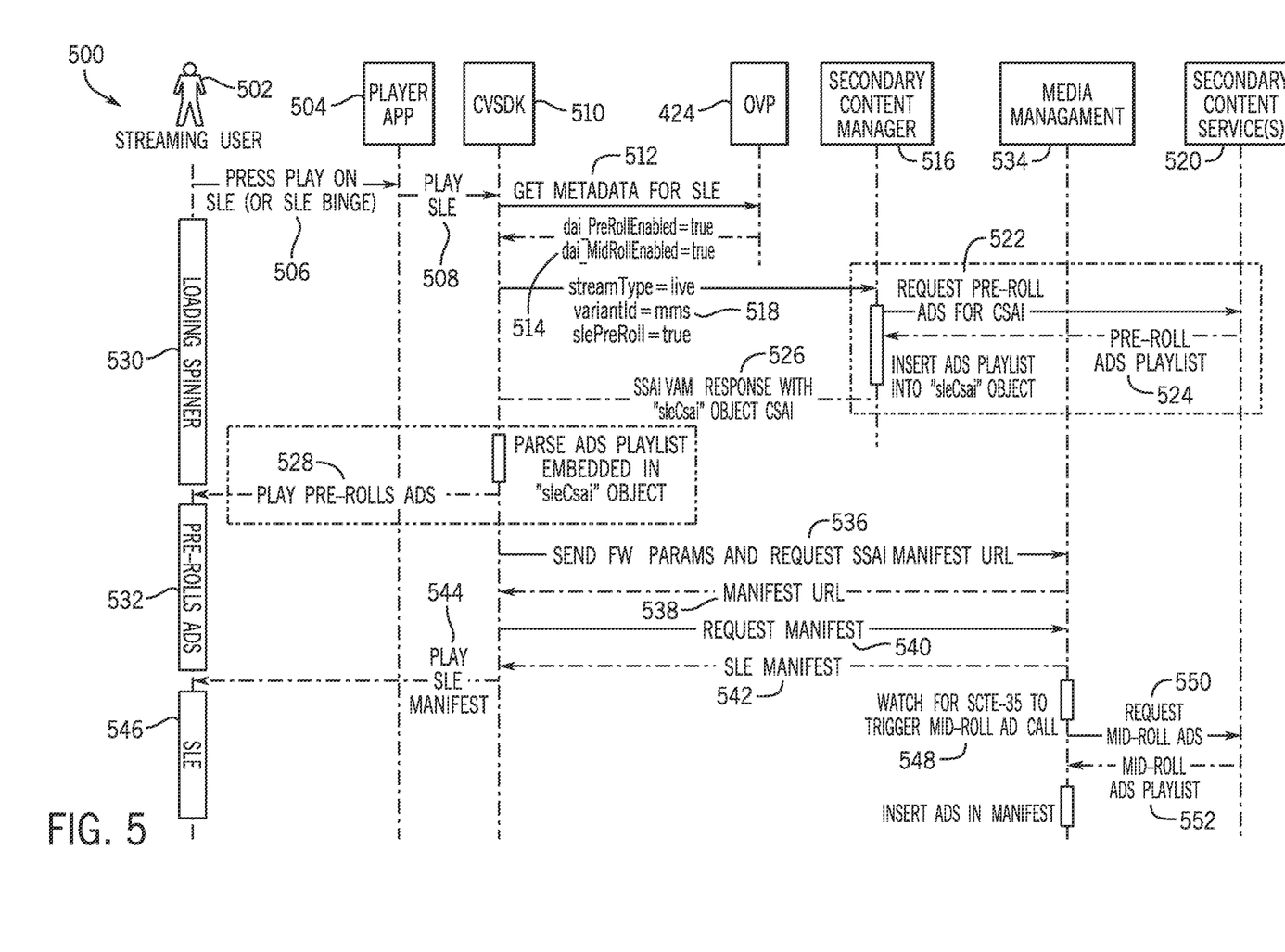
FIG. 5 is a flow diagram that illustrates techniques for temporary pre-roll content provision and playback with a requested streaming content, in accordance with an embodiment of the present disclosure.

Turning now to a playback example, FIG. 5 is a flow diagram that illustrates a process 500 for temporary pre-roll content provision and playback with a requested streaming content, in accordance with an embodiment of the present disclosure. The process 500 begins with a streaming end-user 502 requesting play back of streaming content (e.g., here a single live event (SLE), request by selecting a "play" affordance associated with the streaming content on a player application and/or website 504 (step 506).

The player application and/or website 504 triggers playback of the requested streaming content (step 508) by invoking by the core video software development kit (SDK) 510, which is a wrapper around a native player, customized to perform custom logic (e.g., logic for facilitating the temporary pre-roll presentation described herein). For example, the Core Video SDK 510 may request the metadata indicating whether pre-roll content (to be inserted via client side content insertion) should be presented from the OTT video platform 424, discussed above with respect to FIG. 4 (step 512). In response, the OTT video platform 424 may return the metadata (step 514).

As illustrated, in the current example, the metadata indicates that pre-roll content and mid-roll content is enabled and, thus, should be displayed. Accordingly, the Core Video SDK 510 provides an indication of a request to pre-roll active streaming content to a secondary content manager 516 (step 518).

In response, the secondary content manager 516 request pre-roll content (e.g., one or more pre-roll ads) from a secondary content service 520 (e.g., an ad provision service) (step 522). In response, the secondary content service 520 returns an indication of pre-roll content (to be inserted via client side content insertion) to present with the requested streaming content (step 524). For example, the indication of pre-roll content may include a playlist of zero or more pieces of pre-roll content, selected based upon pre-roll content provision rules, as discussed above.

As illustrated, the pre-roll content playlist may be inserted into an object, which is returned by the secondary content manager 516 to the Core Video SDK 510 for playback (step 526). The Core Video SDK may parse the pre-roll content playlist from the returned object and begin playback of the pre-roll content indicated in the playlist (step 528).

As indicated by bar 530, during the above steps, between selecting play and beginning playback of the pre-roll content, a loading indicator (e.g., spinner) may be presented. Bar 532 illustrates the start of playback of the pre-roll content.

As illustrated, during playback of the pre-roll content, the Core Video SDK 510 may begin loading simultaneously the requested streaming content from a media management system 534. For example, at step 536, the Core Video SDK 510 sends a request for the requested streaming content manifest location (e.g., uniform resource locator (URL)), which is returned at step 538. Once the manifest URL is obtained, the Core Video SDK 510 requests the manifest at the manifest URL (step 540), resulting in the manifest being returned (step 542). Once the manifest is received and the pre-roll content playback finishes, the Core Video SDK 510 may play the requested streaming content (step 544) based on the received manifest, starting with a segment associated with a current playback time, as illustrated by bar 546.

As mentioned above, with live content (and other content), the streaming user 502 may begin playback at a point later than an initial segment of the requested streaming content. Using the current techniques, as playback of the requested streaming content is initiated and/or begins, playback by the Core Video SDK 510 of the requested streaming content, past, present, and future, is defined by the requested streaming content manifest. Accordingly, when the streaming user time shifts the playback of the requested streaming content to a time prior to the start of playback observed by (e.g., before bar 546), the Core Video SDK 510 may identify segments of the requested streaming content to obtain and playback in accordance with timing of the content player app and/or website 504, in lieu of repeating playback of the pre-roll content or failing to playback missed segments because there were not originally played. As may be appreciated, this may provide a significant improvement to a digital streaming experience as the streaming user 502 may not be overburdened with pre-roll content and may observe missed segments of streamed content.

Because the mid-roll metadata indicated that mid-rolls should be played, the requested streaming content manifest may be modified to insert custom mid-roll content. During the playback of the requested streaming content (e.g., during the time associated with bar 546), the manifest may be modified by the media management system 534, which may identify Society of Cable and Telecommunications Engineering (SCTE)-35 messages (or markers), indicating a content insertion cueing (step 548). Upon observing such a SCTE-35 message, the media management system 534 may request mid-roll content (e.g., ads) (step 550), resulting in a return of a mid-roll playlist from the secondary content service 520 (step 552). The mid-roll content indicated in the mid-roll content playlist is inserted into the manifest, resulting in the mid-roll content segments being obtained and presented in the playback by the Core Video SDK 510. Because the scheduled content in the manifest begins at the beginning of bar 546, custom mid-roll content prior to the beginning of bar 546 (e.g., the playback of the requested streaming content by the streaming user 502) might alter the schedule, which may cause issues with subsequent playback. Accordingly, for mid-roll cueing events that occur prior to the initial playback time (e.g., prior to the playback time associated with the start of bar 546), the system may refrain from custom mid-roll content insertion. Instead, the Core Video SDK 510 may playback default insertion period segments (e.g., generic slate renderings) specified by the requested streaming content manifest.

Figure 6:
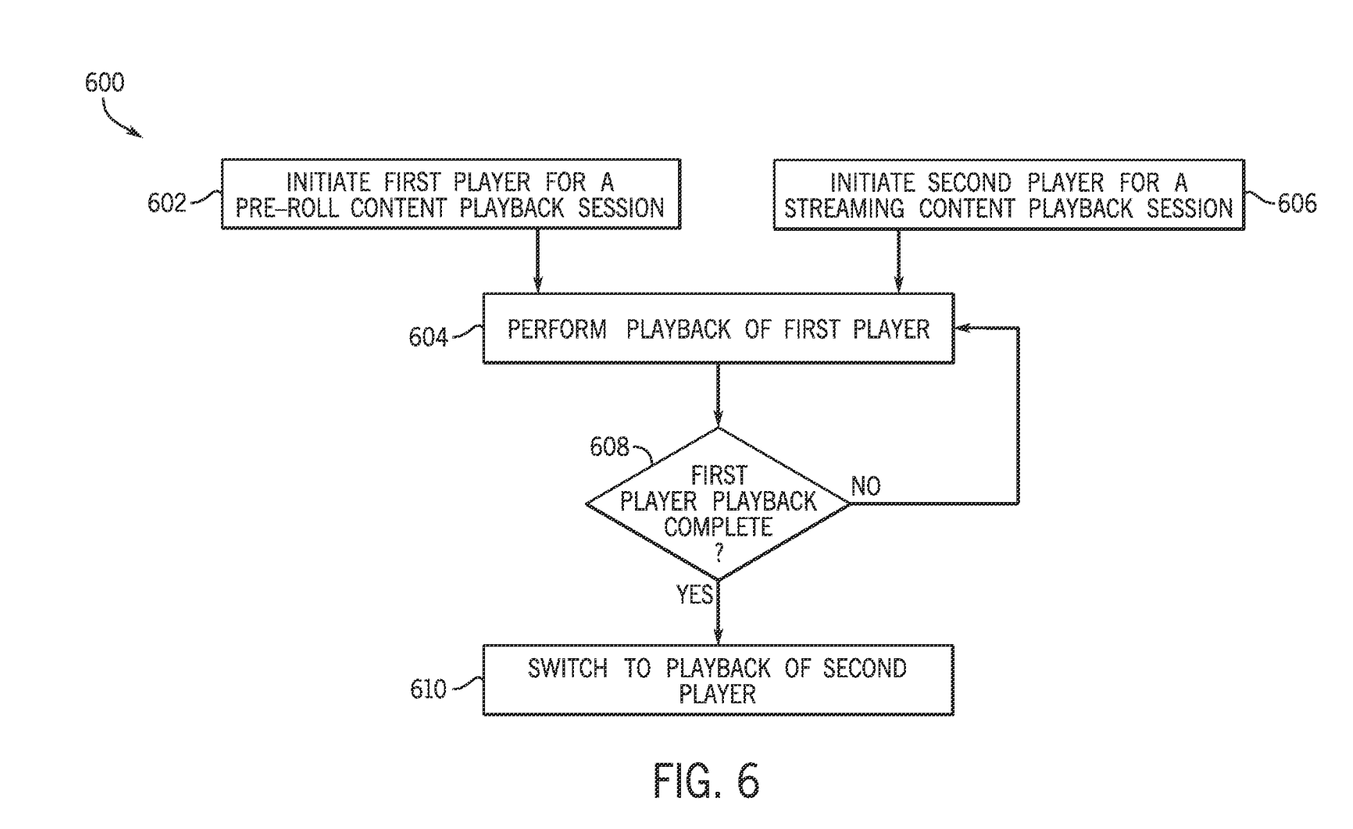
FIG. 6 is a flowchart, illustrating a process for switching from playback of pre-roll content to playback of the requested streaming content by using two content players, in accordance with an embodiment of the present disclosure.
Figure 7:
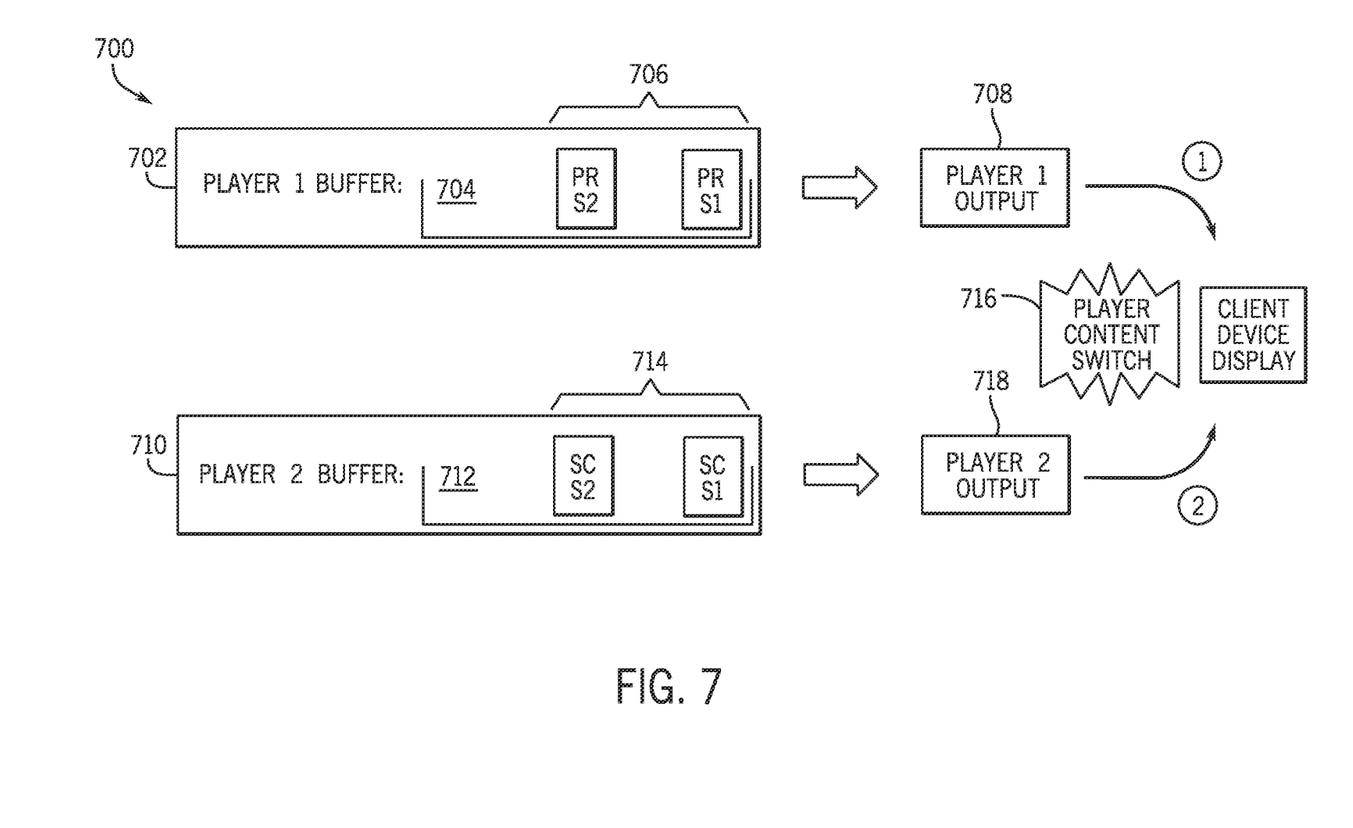
FIG. 7 is a schematic diagram, visually illustrating the process of FIG. 6, in accordance with an embodiment of the present disclosure.
Figure 8:
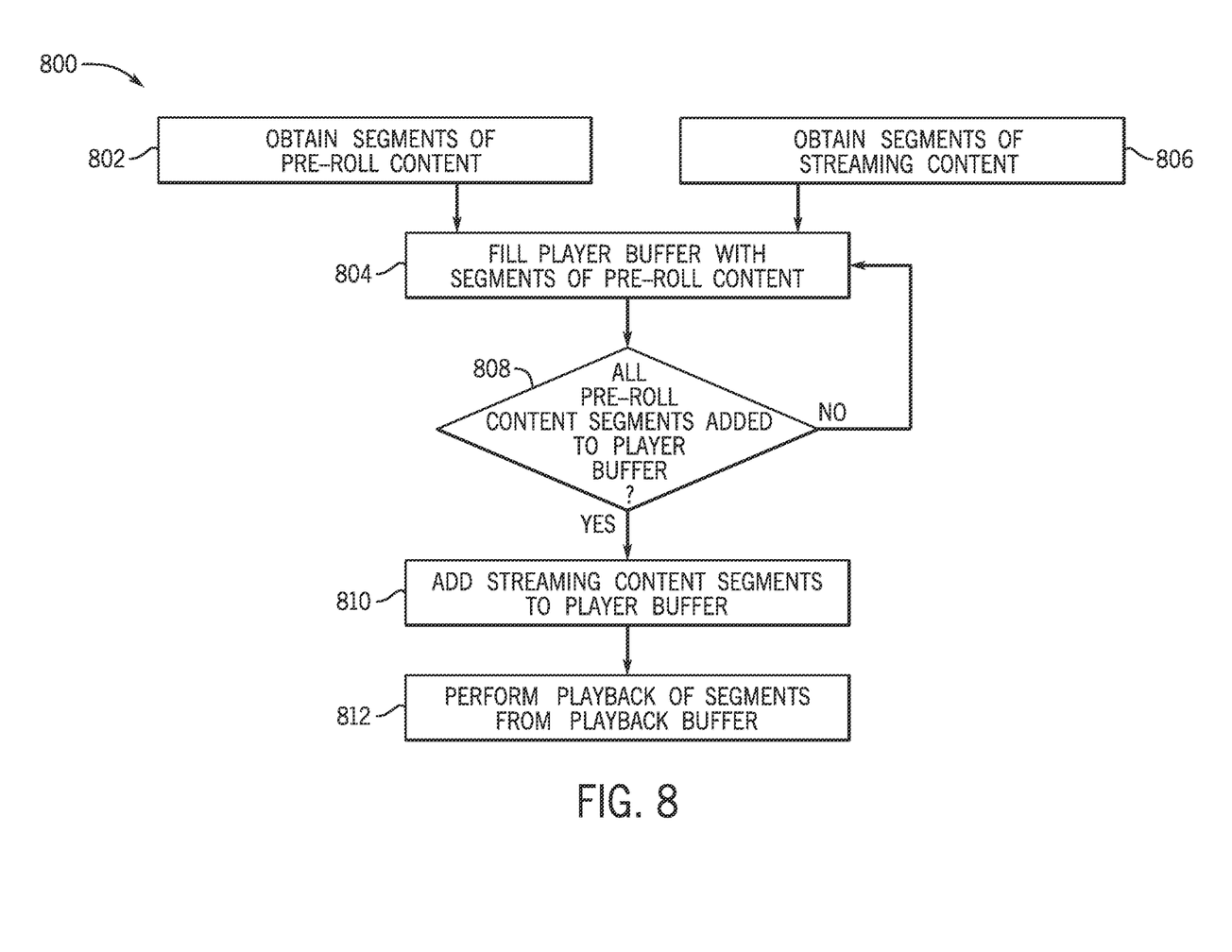
FIG. 8 is a flowchart, illustrating a process for switching from playback of pre-roll content to playback of the requested streaming content using a common playback buffer, in accordance with an embodiment of the present disclosure.
Figure 9:
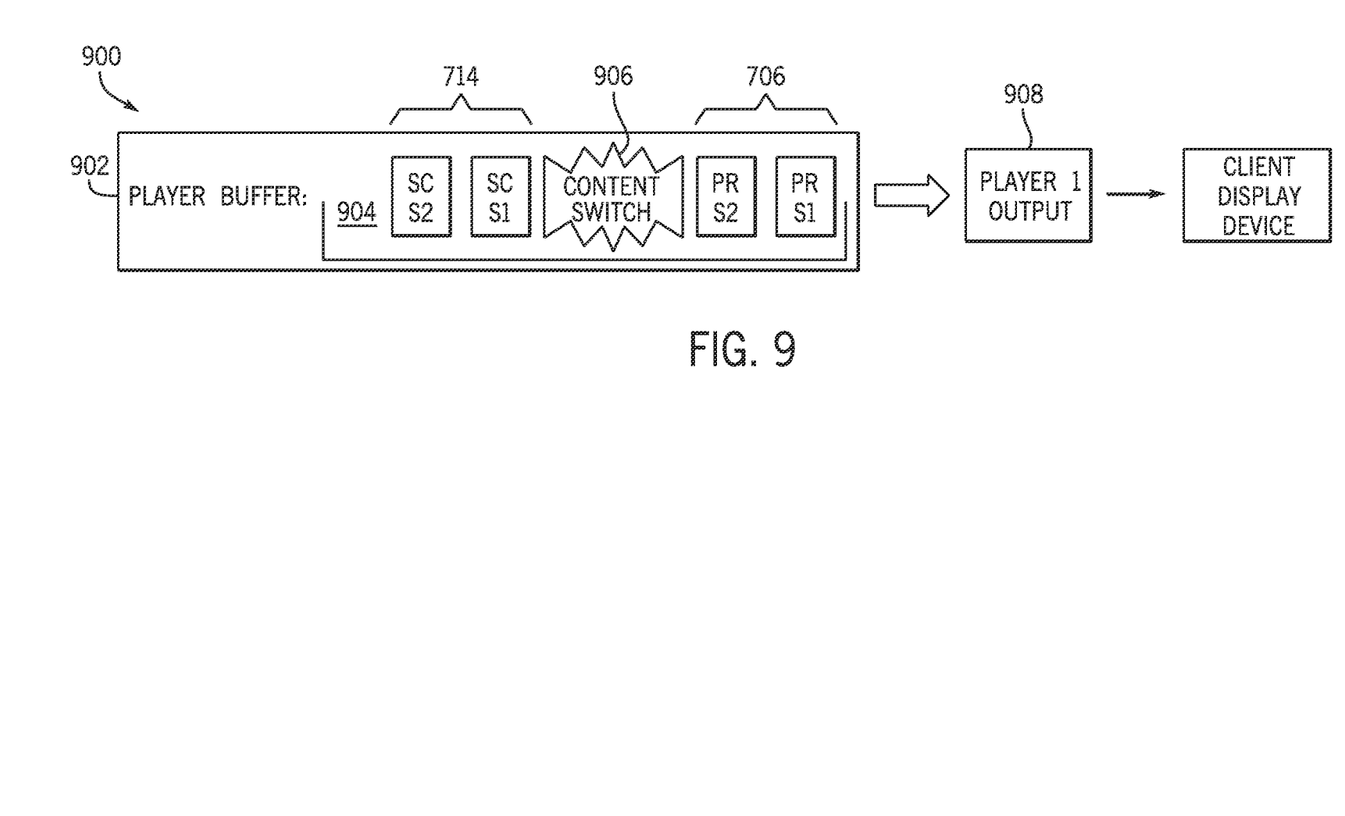
FIG. 9 is a schematic diagram, visually illustrating the process of FIG. 8, in accordance with an embodiment of the present disclosure.

Turning now to a discussion of switchover between playing pre-roll content to requested streaming content, FIGS. 6 and 8 illustrate two embodiments that may be used to switchover playback. FIGS. 7 and 9 illustrate resulting buffers and player instances resulting from the processes of FIGS. 6 and 8, respectively. For simplicity, these FIGS. will be discussed together.

Starting first with a multi-buffer and/or multi-player technique, FIG. 6 is a flowchart, illustrating a process 600 for switching from playback of pre-roll content to playback of the requested streaming content by using two content players, in accordance with an embodiment of the present disclosure. FIG. 7 is a schematic diagram, visually illustrating the process of FIG. 6, in accordance with an embodiment of the present disclosure. The process 600 begins with initiating a first player for Pre-Roll Content Playback Session (block 602). For example, as discussed herein, the first player (e.g., Player 702 of FIG. 7) may include a player buffer (e.g., Buffer 704) that is filled with Pre-Roll Content Segments (e.g., segments 706) identified via a pre-roll content manifest and/or a pre-roll playlist provided by the secondary content service 520 and/or secondary content manager 516. The segments 706 may be played back by the first player (block 604 and illustrated as player 1 output 708 of FIG. 7).

In parallel with instantiating the first player in block 602 and/or performing playback via the first player in block 604, a second player may be instantiated for the requested streaming content playback session (block 606). For example, returning to FIG. 7, a second player 710 is instantiated with a player buffer 712 that is filled with requested streaming content segments 714 indicated in the requested streaming content manifest.

Using the pre-roll content manifest and/or the current playback time of the pre-roll content, a determination is made as to whether playback of the pre-roll content (e.g., the content of player 1 702) is complete (decision block 608). If not, the playback via the first player continues (block 604) until playback of the pre-roll content is complete.

Once the playback of the pre-roll content is complete, the logic of the Core Video SDK may switch player playback from the first player 702 to the second player 710 (e.g., as indicated by player content switch callout 716 to player 2 output 718). In this manner, the client device display may switch from player 1 output 708 to parallel-loaded content in player 2 output 718.

In another embodiment, in lieu of instantiating two players and/or player buffers, a single player and/or player buffer may be used, where the player buffer stores both the pre-roll content segments and the requested streaming content segments. FIG. 8 is a flowchart, illustrating a process 800 for switching from playback of pre-roll content to playback of the requested streaming content using a common playback buffer, in accordance with an embodiment of the present disclosure. FIG. 9 is a schematic diagram, visually illustrating the process of FIG. 8, in accordance with an embodiment of the present disclosure.

The process 800 begins by obtaining pre-roll content segments (block 802). For example, as discussed above, the pre-roll content segments may be identified from a pre-roll content manifest and/or playlist provided by the secondary content service 520 and/or secondary content manager 516. A player buffer of a streaming content player (e.g., Player 902's player buffer 904) may be filled with the obtained pre-roll content segments (e.g., segments 706). In parallel with obtaining the pre-roll content segments and/or filling the player buffer with the pre-roll content segments, segments of the requested streaming content may be obtained (block 806).

At decision block 808, a determination is made as to whether all of the pre-roll content segments have been added to the player buffer. If not, the player continues to fill the player buffer with the pre-roll content segments (e.g., block 804) until all of the pre-roll content segments have been added to the buffer. At this point, the requested streaming content segments may be added to the buffer. For example, as illustrated in FIG. 9, content segments 714, indicated in requested streaming media manifest, are added to the player buffer 904 after the pre-roll content segments 706. This effectively creates a content switch, as indicated by content switch callout 906. For example, as the player begins playback of the segments to the client display device (block 812) in the buffer, the pre-roll content will play first, followed by the requested streaming content segments. It is important to note that while the flowchart of FIG. 8 illustrates playback occurring after the streaming content segments are added to the buffer, the performance of the playback may be performed in parallel with blocks 804-810. Indeed, in some instances, upon insertion of one segment of pre-roll content within the player buffer, the player playback may begin.

While only certain features of the present disclosure have been illustrated and described herein, many modifications and changes will occur to those skilled in the art. It is, therefore, to be understood that the appended claims are intended to cover all such modifications and changes as fall within the true spirit of the present disclosure.

The invention claimed is:

1. A tangible, non-transitory machine-readable medium comprising machine-readable instructions that, when executed by one or more processors, cause the one or more processors to:
receive a request to initiate streaming of a requested streaming content;
cause a temporary pre-roll presentation of pre-roll content that is presented prior to presentation of the requested streaming content but not during a backward playback time shift, by causing one or more streaming content players to:
access a pre-roll manifest indicating pre-roll content segments for playback of the pre-roll content during a pre-roll playback time;
in response to accessing the pre-roll manifest, obtain the pre-roll content segments for playback of the pre-roll content and requested streaming content segments for playback of the requested streaming content including requested streaming content segments that would have played during the pre-roll playback time;
perform the playback of at least a subset of the pre-roll content in accordance with the pre-roll manifest; and
upon completion of the playback of the pre-roll content, switch to playback of the requested streaming content segments, by switching to playback in accordance with a manifest of the requested streaming content, wherein content segments to obtain for subsequent time-shifted playback of the requested streaming content corresponding to the pre-roll playback time are defined by the manifest of the requested streaming content.

2. The tangible, non-transitory machine-readable medium of claim 1, comprising machine-readable instructions that, when executed by the one or more processors, cause the one or more processors to:
obtain the requested streaming content segments in parallel with obtaining the pre-roll content segments, playback of the pre-roll content segments, or both.

3. The tangible, non-transitory machine-readable medium of claim 1, comprising machine-readable instructions that, when executed by the one or more processors, cause the one or more processors to:
cause the one or more streaming content players to switch to playback of the requested streaming content segments, by causing the one or more streaming content players to:
first, insert, into a common player buffer, the pre-roll content segments for playback; and
second, after all pre-roll content segments have been added to the common player buffer, insert, into the common player buffer, the requested streaming content segments, such that the requested streaming content segments play after the pre-roll content segments.

4. The tangible, non-transitory machine-readable medium of claim 1, comprising machine-readable instructions that, when executed by the one or more processors, cause the one or more processors to:
cause the one or more streaming content players to switch to playback of the requested streaming content segments, by causing the one or more streaming content players to:
instantiate a first streaming content player with a first buffer and fill the first buffer with the pre-roll content segments;
instantiate a second streaming content player with a second buffer and fill the second player buffer with the requested streaming content segments;
playback the first buffer via the first streaming content player; and
upon completion of the playback of the first buffer, switch to playback of the second buffer via the second streaming content player.

5. The tangible, non-transitory machine-readable medium of claim 1, wherein the manifest of the requested streaming content comprises an indication of segments of the requested streaming content that occurred prior to a start time of the playback of the requested streaming content segments, and wherein the manifest of the requested streaming content does not include the pre-roll content segments.

6. The tangible, non-transitory machine-readable medium of claim 5, comprising machine-readable instructions that, when executed by the one or more processors, cause the one or more processors to:

cause the one or more streaming content players to playback at least a portion of the segments of the requested streaming content that occurred prior to the start time of the playback of the requested streaming content segments, based upon a backward time-shift operation to a playback time prior to the start time of the playback, wherein the playback does not include the pre-roll content segments.

7. The tangible, non-transitory machine-readable medium of claim 6, where the playback time corresponds to a playback time when the pre-roll content segments were played back.

8. The tangible, non-transitory machine-readable medium of claim 1, comprising machine-readable instructions that, when executed by the one or more processors, cause the one or more processors to:
determine whether the pre-roll content should be presented with the requested streaming content based on received metadata associated with the requested streaming content; and
cause the one or more streaming content players to refrain from presenting the pre-roll content when the pre-roll content should not be presented with the requested streaming content.

9. The tangible, non-transitory machine-readable medium of claim 8, comprising machine-readable instructions that, when executed by the one or more processors, cause the one or more processors to:
determine whether the pre-roll content should be presented with the requested streaming content by polling a secondary content service that maintains rules that utilize characteristics of: an end-user, secondary content criteria, or both.

10. A computer-implemented method, comprising:
determining that at least a subset of pre-roll content should be played back before presentation of requested streaming content;
initiating pre-roll content playback prior to presentation of the requested streaming content, by causing one or more streaming content players to perform the pre-roll content playback in accordance with a pre-roll manifest;
in parallel with the pre-roll content playback, obtaining segments of the requested streaming content including requested streamlining content segments that would have played during the pre-roll content playback; and
upon completion of the pre-roll content playback, beginning playback of the requested streaming content, by switching to playback in accordance with a manifest of the requested streaming content, wherein content segments, to obtain for subsequent time-shifted playback of the requested streaming content has a playback time corresponding to a pre-roll content playback time, are defined by the manifest of the requested streaming content.

11. The computer-implemented method of claim 10, comprising:
beginning playback of the requested streaming content after completion of the pre-roll content playback, by:
first, inserting, into a common player buffer, pre-roll content segments for playback; and
second, after all pre-roll content segments have been added to the common player buffer, inserting, into the common player buffer, requested streaming content segments, such that the requested streaming content segments play after the pre-roll content segments.

12. The computer-implemented method of claim 10, comprising:
beginning playback of the requested streaming content after completion of the pre-roll content playback, by:
instantiating a first streaming content player with a first buffer and fill the first buffer with pre-roll content segments;
instantiating a second streaming content player with a second buffer and fill the second player buffer with requested streaming content segments;
playing back the first buffer via the first streaming content player; and
upon completion of the playback of the first buffer, switching to playback of the second buffer via the second streaming content player.

13. The computer-implemented method of claim 10, comprising obtaining the requested streaming content segments based upon an indication in the manifest of segments of the requested streaming content corresponding to a start time of the playback of the requested streaming content.

14. The computer-implemented method of claim 13, wherein the manifest of the requested streaming content comprises an indication of segments of the requested streaming content that occurred prior to a start time of the playback of the requested streaming content segments; and the computer-implemented method comprises:
performing a backward time-shift operation to playback at least a portion of the segments of the requested streaming content that occurred prior to the start time of the playback of the requested streaming content segments, using the indication of segments of the requested streaming content that occurred prior to the start time of the playback of the requested streaming content segments, wherein the playback does not include the pre-roll content segments.

15. The computer-implemented method of claim 14, wherein a playback time of the backward time-shift operation corresponds to a playback time when at least a portion of the pre-roll content was played back.

16. A system, comprising:
a graphical user interface (GUI) configured to provide an affordance to request playback of streaming content;
a streaming content player application configured to playback the requested streaming content;
a core video software development kit (SDK) comprising a wrapper to the streaming content player application to add custom functionality to the streaming content player application, the custom functionality comprising a temporary pre-roll presentation functionality that causes pre-roll content to be presented prior to presentation of the requested streaming content but not during a backward playback time shift;
wherein the temporary pre-roll presentation function is implemented, by causing the streaming content player application to:
access a pre-roll manifest indicating pre-roll content segments for playback of the pre-roll content during a pre-roll playback time;
in response to accessing the pre-roll manifest, obtain the pre-roll content segments for playback of the pre-roll content and requested streaming content segments for playback of the requested streaming content including requested streaming content segments that would have played during the pre-roll playback time;
perform the playback of at least a subset of the pre-roll content in accordance with the pre-roll manifest; and upon completion of the playback of the pre-roll content, switch to playback of the requested streaming content segments, by switching to playback in accordance with a manifest of the requested streaming content, wherein content segments to obtain for subsequent time-shifted playback of the requested streaming content corresponding to the pre-roll playback time are defined by the manifest of the requested streaming content.

17. The system of claim 16, wherein the switch to playback of the requested streaming content segments is implemented by causing the streaming content player to:
first, insert, into a common player buffer, the pre-roll content segments for playback; and
second, after all pre-roll content segments have been added to the common player buffer, insert, into the common player buffer, the requested streaming content segments, such that the requested streaming content segments play after the pre-roll content segments.

18. The system of claim 16, wherein the switch to playback of the requested streaming content segments is implemented by causing the core video SDK to:
instantiate a first streaming content player with a first buffer and fill the first buffer with the pre-roll content segments;
instantiate a second streaming content player with a second buffer and fill the second player buffer with the requested streaming content segments;
playback the first buffer via the first streaming content player; and
upon completion of the playback of the first buffer, switch to playback of the second buffer via the second streaming content player.

19. The system of claim 16, wherein the core video SDK is configured to cause the streaming content player application to:
obtain the requested streaming content segments based upon an indication in the manifest of segments of the requested streaming content corresponding to a start time of the playback of the requested streaming content, wherein the manifest of the requested streaming content comprises an indication of segments of the requested streaming content that occurred prior to a start time of the playback of the requested streaming content segments; and
perform a backward time-shift operation to playback at least a portion of the segments of the requested streaming content that occurred prior to the start time of the playback of the requested streaming content segments, using the indication of segments of the requested streaming content that occurred prior to the start time of the playback of the requested streaming content segments.

20. A computer-implemented method, comprising:
receive, from a requesting component, a request for presentation of requested streaming content, the request for presentation of requested streaming content comprising an indication that pre-roll content should be presented with the requested streaming content;
in response to receiving the request for presentation of requested streaming content, identify pre-roll content to be played back prior to presentation of the requested streaming content;
provide an indication of the pre-roll content to the requesting component for presentation of the requested streaming content;
during playback of the pre-roll content, receive a request for a manifest location of a manifest of the requested streaming content;
in response to receiving the request for the manifest location, provide an indication of the manifest location, enabling download of segments of the requested streaming content and switch over to presentation of the requested streaming content after presentation of the pre-roll content concludes, wherein content segments to obtain during subsequent time shifting during playback of the requested streaming content are defined by the manifest of the requested streaming content.

21. The computer-implemented method of claim 20, wherein the requesting component comprises a core video software development kit (SDK) comprising a wrapper to a streaming content player application that performs presentation of the pre-roll content and the requested streaming content to add custom functionality to the streaming content player application, the custom functionality comprising a temporary pre-roll presentation functionality that causes pre-roll content to be presented prior to presentation of the requested streaming content but not during a backward playback time shift.

22. The computer-implemented method of claim 20, comprising:
receiving, from the requesting component, a request for metadata defining whether pre-roll content should be presented with the requested streaming content; and
in response to receiving the request for metadata, provide the metadata to the requesting component, the metadata indicating that pre-roll content should be presented with the requested streaming content;
wherein the request for presentation of requested streaming content comprises the indication that pre-roll content should be presented with the requested streaming content based upon the metadata.

* * * * *